(12) United States Patent
Wang et al.

(10) Patent No.: US 11,301,633 B2
(45) Date of Patent: Apr. 12, 2022

(54) TECHNICAL DOCUMENT ISSUES SCANNER

(71) Applicant: Microsoft Technology Licensing, LLC, Redmond, WA (US)

(72) Inventors: Ying Wang, Shanghai (CN); Min Li, Shanghai (CN); Mengyan Lu, Shanghai (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/313,337

(22) PCT Filed: Dec. 25, 2018

(86) PCT No.: PCT/CN2018/123351
§ 371 (c)(1),
(2) Date: Dec. 26, 2018

(87) PCT Pub. No.: WO2020/132850
PCT Pub. Date: Jul. 2, 2020

(65) Prior Publication Data
US 2021/0312131 A1    Oct. 7, 2021

(51) Int. Cl.
*G06K 9/00* (2006.01)
*G06F 40/295* (2020.01)
(Continued)

(52) U.S. Cl.
CPC .......... *G06F 40/295* (2020.01); *G06F 16/288* (2019.01); *G06F 40/284* (2020.01);
(Continued)

(58) Field of Classification Search
CPC .... G06F 40/295; G06F 16/288; G06F 40/284; G06K 9/00442; G06K 2209/504;
(Continued)

(56) References Cited

U.S. PATENT DOCUMENTS

| 2017/0017897 A1* | 1/2017 | Bugay ...................... G06F 40/18 |
| 2017/0060835 A1 | 3/2017 | Radford et al. |
| 2018/0218284 A1* | 8/2018 | Jawahar ................... G06N 3/08 |

FOREIGN PATENT DOCUMENTS

| CN | 105468605 A | 4/2016 |
| CN | 105512197 A | 4/2016 |

OTHER PUBLICATIONS

"Open Specifications", Retrieved From: http://web.archive.org/web/20180726104704/https://msdn.microsoft.com/en-us/library/dd208104.aspx, Retrieved Date: Jul. 26, 2018, 2 Pages.
(Continued)

*Primary Examiner* — Charlotte M Baker

(57) ABSTRACT

A technical document scanner disclosed herein determines and categorizes various common issues among a large number of documents. An implementation of the technical document scanner is implemented using various computer process instructions including scanning a technical document to extract content, applying named entity recognition on the extracted content from the technical document to extract named entities, applying relation extraction on the named entities to extract relations between the named entities, and analyzing the relations between the entities to compose lists of high relevance entities for issue checking.

20 Claims, 6 Drawing Sheets

(51) Int. Cl.
*G06N 20/00* (2019.01)
*G06F 16/28* (2019.01)
*G06F 40/284* (2020.01)

(52) U.S. Cl.
CPC ......... *G06K 9/00442* (2013.01); *G06N 20/00* (2019.01); *G06K 2209/504* (2013.01)

(58) Field of Classification Search
CPC .. G06K 9/00476; G06K 9/6269; G06K 9/627; G06N 20/00
USPC ....................................................... 382/112
See application file for complete search history.

(56) References Cited

OTHER PUBLICATIONS

"International Search Report and Written Opinion Issued in PCT Application No. PCT/CN18/123351", dated Aug. 28, 2019, 9 Pages.

\* cited by examiner

TECHNICAL DOCUMENT ISSUES SCANNER

BACKGROUND

Technology companies publish documents online and that allow users to understand various products, such as databases, computer programming interfaces, word processing software, hardware products, network protocols, API documents, etc. Inspection of such technical document is an important procedure before publication. However, manually checking the documents for accuracy and completeness is time-consuming and tedious, especially when the documents have over hundreds of pages. Moreover, some issues (e.g. inconsistent or missing information, cross reference, etc.) are hard to be captured by human reviewers.

SUMMARY

Implementations described herein discloses a technical document scanner determines and categorizes various common issues among a large number of documents. An implementation of the technical document scanner is implemented using various computer process instructions including scanning a technical document to extract content, applying named entity recognition on the extracted content to extract named entities from the technical document, applying relation extraction on the extracted entities to extract relations between the entities, and analyzing the relations between the named entities to compose lists of high relevance entities for issue checking.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Figure 1:
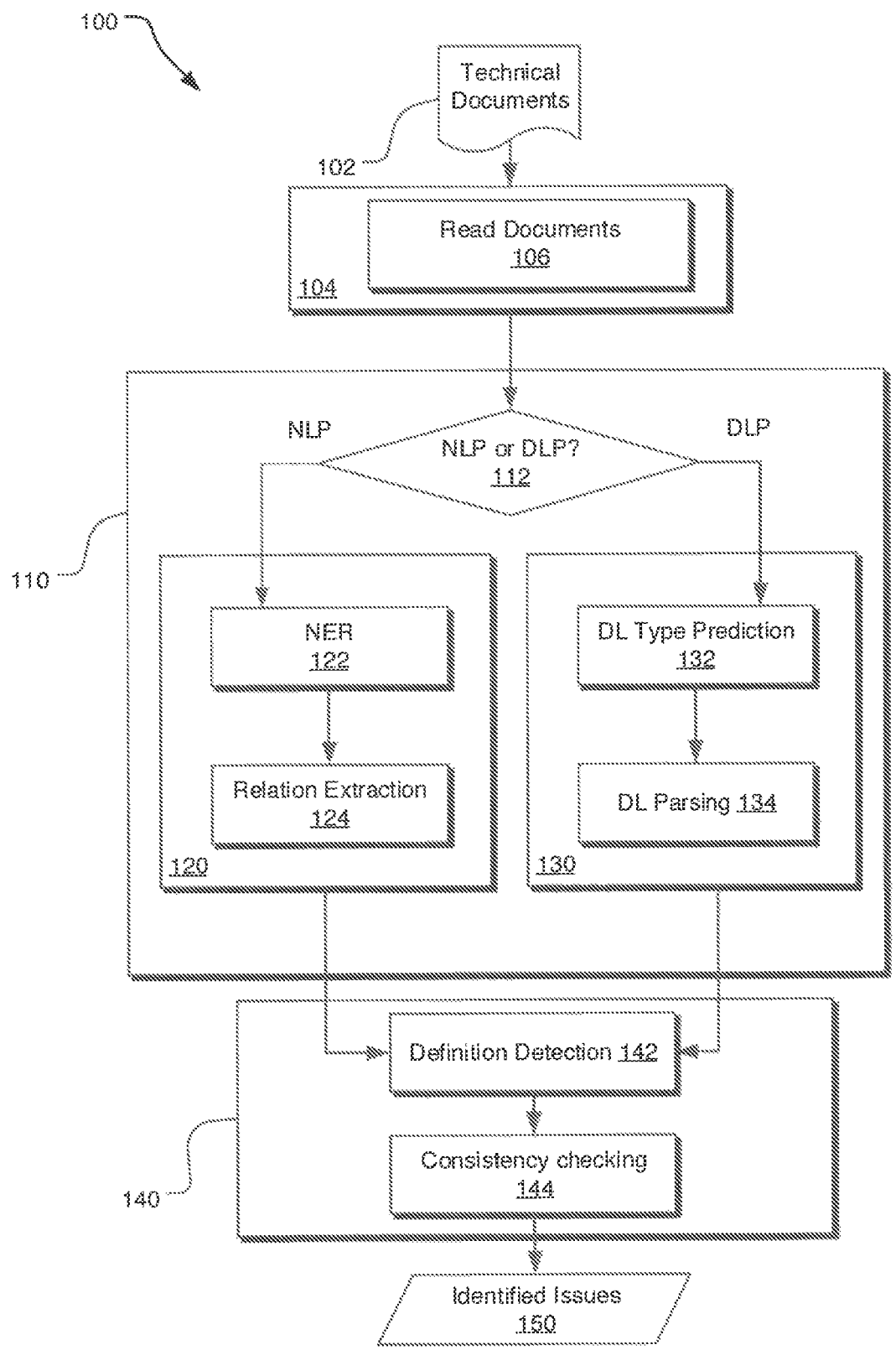
FIG. 1 illustrates an example implementation of a system for technical document issues (TDI) scanner.

Implementations disclosed here provide a technical document scanner. The technical document scanner may use natural language processing (NLP) and machine learning (ML) approaches to scan the documents to categorize various common issues among a large number of documents. For example, an implementation of the technology may use named entity recognition (NER) and relation extraction NLP processes to extract relations between named entities and to analyze the relations between the named entities. For example, some of the common technical document issues (TDIs) may include missing definition, inconsistent naming, wrong reference, inconsistent values, conflicting descriptions, etc.

The technology disclosed herein solves a technical problem of identifying issues in technical documents using technological solutions that include use of machine learning models. Specifically, the technology disclosed herein uses a NER ML model and a relation extraction model that includes a long short-term memory (LSTM) ML model. In one implementation, the LSTM model includes representation of one or more of named entities using bidirectional LSTM-recursive neural networks (RNNs). An implementation of the ML model includes a feature extraction operation using term frequency-inverse term frequency (TF-IDF) on unigrams scanned from the technical document and a classifier training operation using a support vector machine (SVM) classifier to classify the extracted features.

The technical document scanner disclosed herein may use ML models such as supervised learning models such as a support vector machine (SVM) model, deep learning LSTM models, or other deep learning models. The technology disclosed herein docs not rely on hard coded validation rules by extracting information with self-defined named entitles and their relations using NLP and ML methodologies. As the coded rules based approach is hard to maintain and it can only check hard-coded problems, the technical document scanner disclosed herein provides a better solution.

While the technology disclosed herein is disclosed in view of scanning and analyzing technical documents, it may also be used to scan and analyze other types of documents as well. For example, an alternative implementation of the document scanner disclosed herein may be used to scan and analyze legal documents, medical documents, contracts, product descriptions, etc. Thus, the technology disclosed herein may be used by researchers/engineers in other communities.

Furthermore, the technology disclosed herein may also assist human reviewers of documents and in contrast with laborious and expensive manual inspection approaches, the technology disclosed herein provides advantage in both document checking efficiency and accuracy. Furthermore, the document scanner technology disclosed herein is an extendable solution in that over time its performance can be improved by training better ML models. In one implementation, the document scanner technology disclosed herein may be deployed on a cloud environment.

An implementation of the TDI scanner system disclosed herein is a collect-and-feedback system that operates by imitating a human being who has the background knowledge of the technical documents.

FIG. 1 illustrates an example implementation of a system for technical document issues (TDI) scanner 100. The TDI scanner 100 may be implemented on a computing device such as the computing device such as a laptop, a desktop, a server, or a mobile computing device. An example of a computing device and its components are further disclosed in FIG. 6 below. In one implementation, each component of the TDI scanner 100 may implemented on a separate computing device on a cloud.

The implementation of the TDI scanner 100 may be understood to be divided in three modules as disclosed in FIG. 1. Specifically, these, three modules are a reader module 104, an information scanning module 110, and a checking module 140. The reader module 104 ingests technical documents 102, reads the technical documents 102, and stores the content in self-defined structures.

The information scanning module 110 extracts information from the stored content by reader module 104, in both natural languages and description languages. Specifically, the information scanning module 110 uses NLP models for scanning natural language content such as description of structures, implementation details, etc. In one implementation, the NLP models extract important information front technical documents which will be used for completeness and consistency checking. On the other hand, the information scanning module 110 uses description language processing (DLP) models for scanning description language content, such as code.

Examples of the NLP models may include a named entity recognition (NER) model 122 that is configured to retrieve the entities of interest which represent information (e.g. size, type, etc.) and a relation extraction (RE) model (124) to associate the retrieved entities with the ones which represent object definitions or object references (e.g. field definition, structure reference, etc.).

Examples of the DLP models may include a description language (DL) type prediction module 132 that may be implemented using a support vector machine (SVM) classifier to predict the type of DL and a pacing module 134 to parse the content with regular expressions according to the type of DL. In one implementation, all the objects with the associated information from both NL and DL are inserted to either of a definition list or a reference list. An example of a definition list may include FieldDefName1, StructureDefName1, etc., while an example of a reference list may include FieldRefName1, FieldRefName2, StructureRefName1, etc.

The checking module 140 may include a definition detection module 142 that is implemented using an SVM classifier to locate the definition from the definition list for each entity in the reference list output by the information scanning module 310. A consistency checking module 144 may compare the extracted information contained by referred entities with related definitions for consistency check and generate identified issues 144. Various module of the TDI scanner 100 are disclosed in further detail below in FIGS. 2-5. In one implementation, the checking module 140 analyzes the relations between the entities, to compose lists of high relevance entities for issue checking. Such analysis may include inserting an entity into one of the lists to rind related entities based on entity relations to compose a record for that list. Subsequently, information between various lists is compared to according to the named entity.

Figure 2:
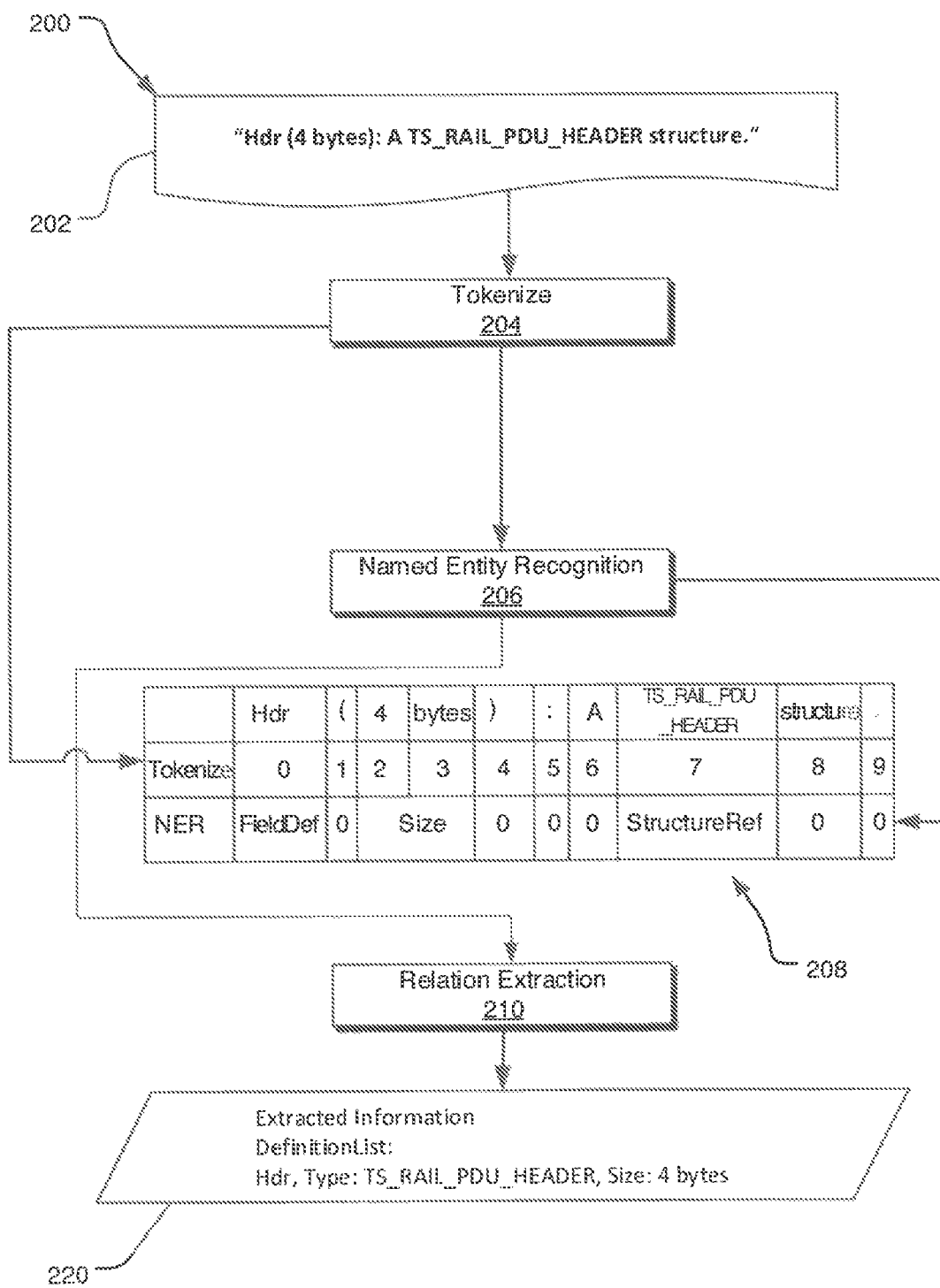
FIG. 2 illustrates an example implementation of natural language processing (NLP) operations used by the TDI scanner disclosed herein.

FIG. 2 illustrates an example implementation of natural language processing (NLP) operations 200 used by the TDI scanner disclosed herein. Specifically, the NLP operations 200 illustrate extracting information from a document 202. In the illustrated implementation, the document 202 includes the following content:

"Hdr (4 bytes): A TS_RAIL_PDU_HEADER structure." Content A

Such content may be from a technical document such as a blog, user manual, online instructions, a protocol specification document, etc. An operation 204 tokenizes the content to generate a row of a content table 208. Specifically, the tokenizer breaks down each part of the content A in tokens 0 to 9.

Subsequently, an NER operation 206 categorizes the tokens 0 to 9 into various entities. For example, the token 0, "Hdr," is categorized as FieldDef, whereas the token 7, "TS_RAIL_PDU_HEADER," is categorized in the StructureRef category. For technical documents, the important entities could be field name, structure name, size, type, etc. In one implementation, an NER model used by operation 206 may be trained using a generally available named entity recognizer model such as the Stanford NER model. For example, the following seventeen (17) customized named entity labels may be used by the NER model:

StructureDef, StructureRef, FieldDef, FieldRef, TypeBasic, TypeModifier, FieldModifier, EnumOrFlag, Value, ValueModifierLevel, ValueModifierRestriction, Size, CollectionLength, SectionName, SectionNum, ReferredDoc, OperationRef, "O" (others).

In one implementation, the NER operation 206 may use a Conditional Random Field (CRF) sequence model.

A relation extraction operation 210 extracts the relations between various tokens 0 to 9 to generate the extracted information 220. Specifically, the relation extraction operation 210 retrieve the relation between entities recognized in NER operation 206 so that the information can be associated to the corresponding objects. In one implementation, an ML classifier may be used to predict relations between two entities. The relation extraction operation 210 is described in further detail in FIG. 3 below. Specifically, the extracted information 220 suggests that content A provides a definition as follows:

"Hdr, Type: TS_RAIL_PDU_HEADER, Size: 4 bytes"

Figure 3:
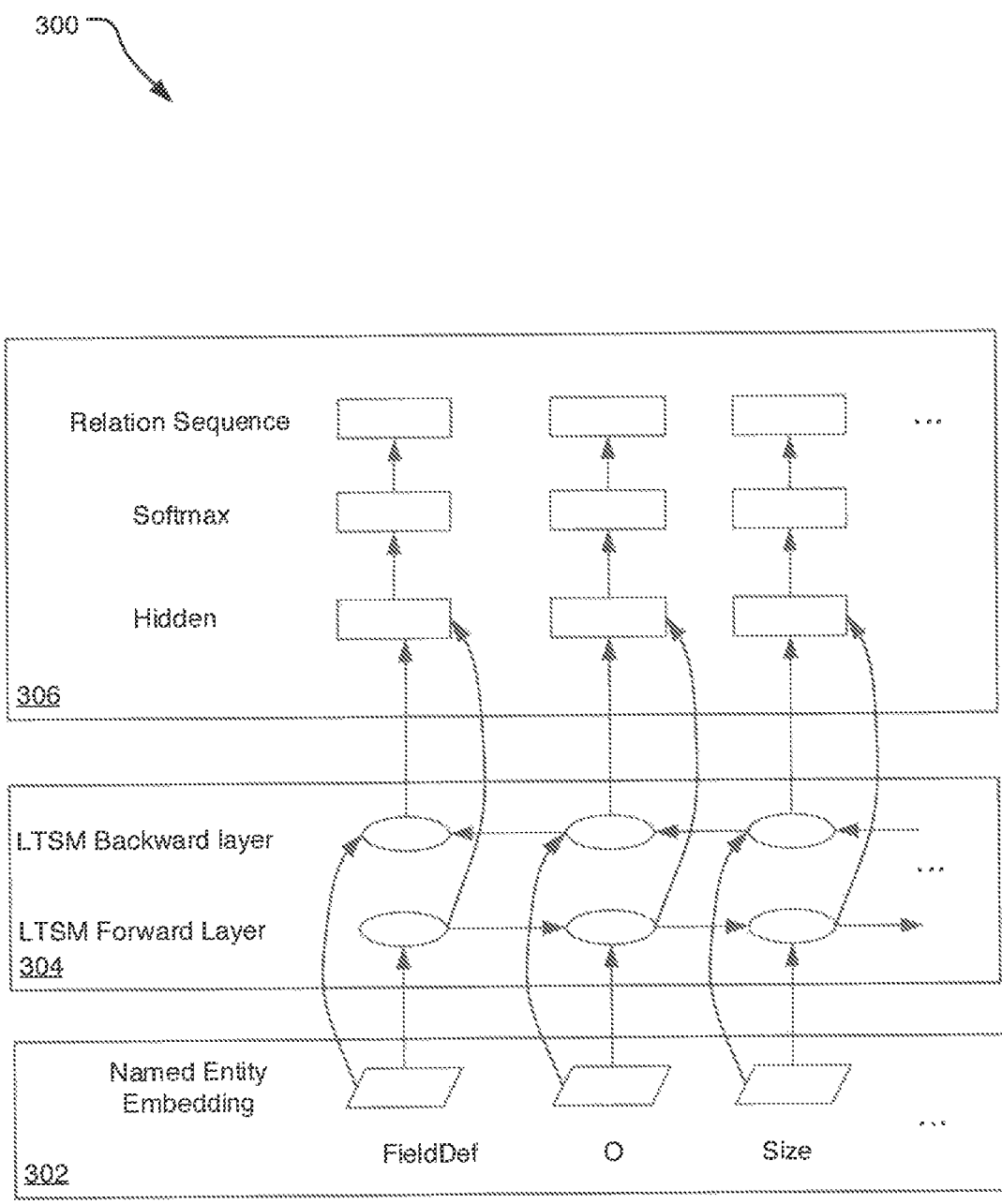
FIG. 3 illustrates example implementation of a relation extraction model of the TDI scanner disclosed herein.

FIG. 3 illustrates example implementation of a relation extraction model 300 of the TDI scanner disclosed herein. In particular, the relation extraction model 300 uses Long short-term memory (LSTM) layer that is capable of exploiting longer range of temporal dependencies in the sequences and avoiding gradient varnishing or exploding the relation extraction model 300 consists of three layers, an input layer 302, an LSTM layer 304, and an output layer 306. The input layer 302 generates representation of each named entities, such as FieldDef, Size, etc., received from previous operations. The LSTM layer represents the named entity sequence of the sentence with bidirectional LSTM-recursive neural networks (RNNs). Specifically, each of the LSTM units at time step t receives the named entity embedding as input vector $x_t$, the previous hidden state $h_{t-1}$, the memory cell vector $c_{t-1}$, and produces the new vectors using the following equations:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tanh(c_t)$$

where σ denotes the logistic function, i, f, o, c and h are respectively the input gate, forget gate, output gate, cell activation vectors, and hidden state vector. W are weight matrices and b are bias vectors.

The output layer 306 employs a hidden layer and a softmax output layer to get the relation labels using the following equations:

$$h_t^{(r)} = \tanh(W_{rh}[y_{t-1}; h_t] + b_{rh})$$

$$y_t = \mathrm{softmax}(W_{ry} h_t^{(r)} + b_y)$$

where, b and h are respectively the weight matrices, bias vectors, and hidden states. The output layer 306 outputs a relation label sequence that represents the relations between a current entity and a first named entity. For example, a named entity sequence may include entities A, B, C, and D and an output of relation sequence may include relations E, F, G, and H, where E represents a relation of entity A with itself, F represents a relation between the entity A and the entity B, G represents a relation between the entity A and the entity C, H represents a relation between the entity A and the entity D, etc.

As the relation extraction model 300 extracts relations between the first named entity in input and a current entity, in one implementation, the named entities are removed from the start so as to predict several relations with different inputs to get all the relations in an input sentence. As one can extract a relation between an input named entity and another entity from the relation extraction model 300, the relation is predicted several times with different input of named entity to extract all relations in a sentence. In one implementation, no relations existed between "O" (others) and other named entities so the relation extraction model 300 ignores entities that are tagged with "O."

For example, if the named entity input sequence is [Field-Def, O, Size, O, Size, TypeModifier, TypeBasic, O], the relation extraction model 300 needs to predict the relations with following four input sequences:

[FieldDef, O, Size, O, Size, TypeModifier, TypeBasic],
[Size, O, Size, TypeModifier, TypeBasic],
[Size, TypeModifier, TypeBasic],
[TypeModifier, TypeBasic]

to get all the relations in the input sentence. Below is an example of relation extraction by the relation extraction model 300 from an input sentence:

Sentence:
  length (2 bytes): A 16-bit, unsigned integer that specifies the packet size. This field MUST be set to 0x0008 (8 bytes).
Relation(s) extracted:
Field_Size: length, 2 bytes
Field_Size: length, 16-bit
Field_Type: length, unsigned integer
Field_Value: length, 0x0008

As a result, the following record is inserted in the definition list:
  length, [Size: 2 bytes], [Size: 16-bit], [Type: unsigned integer], [Value: 0x0008]

Figure 4:
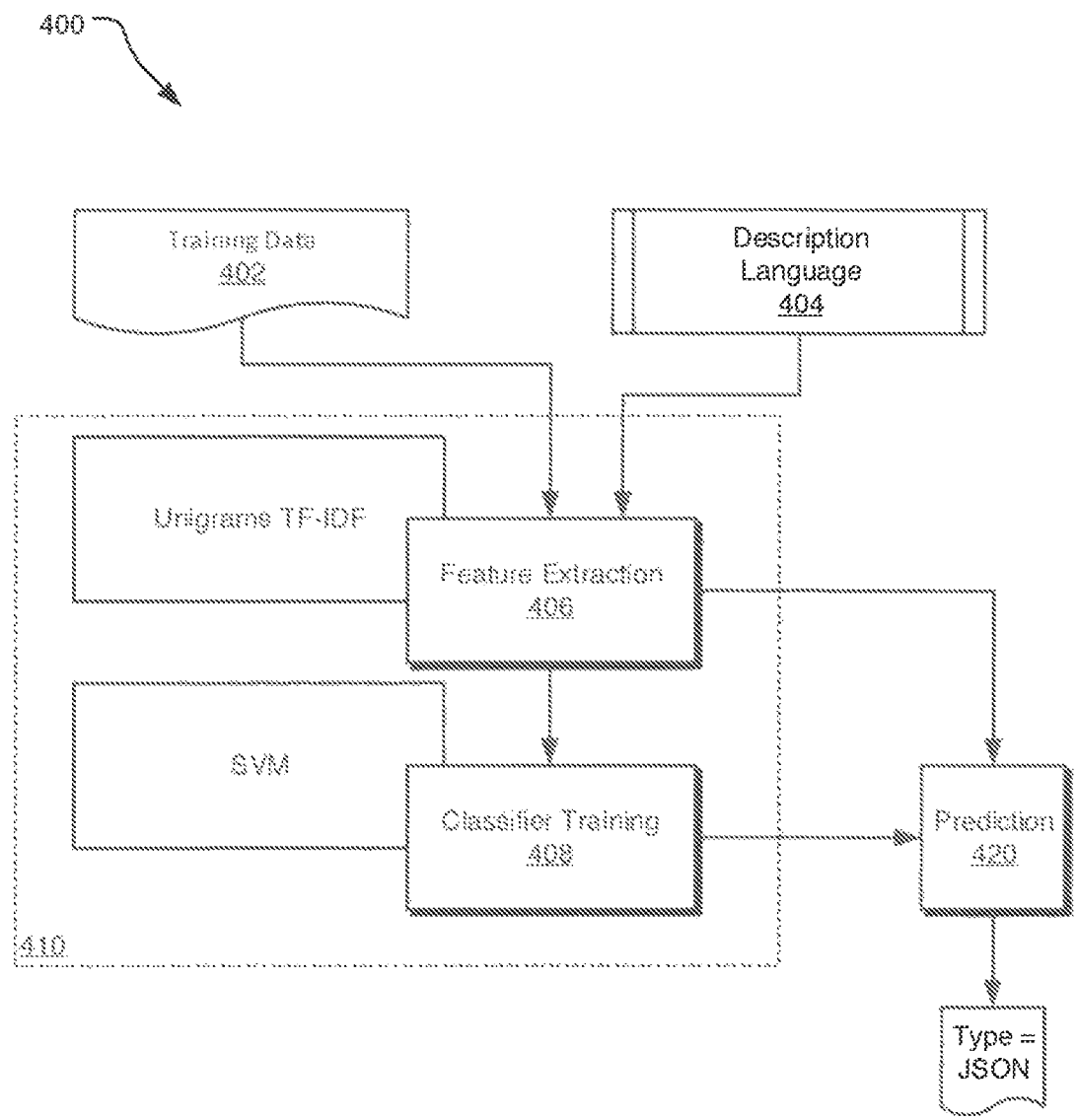
FIG. 4 illustrates example operations for description language classification using machine learning (ML) according to implementations disclosed herein.

FIG. 4 illustrates example operations 400 for description language (DL) processing (DL) using machine learning (ML) according to implementations disclosed herein. The DL processing operations 400 may include DL type prediction and DL parsing. For example, the operation 400 predicts the type of DL 404 using an ML model 410 that may be trained on training data 402. The feature extraction module 406 of the ML model may use term frequency—inverse term frequency (TF-IDF) on unigrams scanned from the DL 404 to identify features from the DL 404.

Furthermore, the feature extraction module 406 also extracts features with conjunctions of characters, such as [ ], [{ }], [STRING, . . . , etc. A classifier training module 408 using SVM allows generating prediction 420 of the type of the DL 404. In one implementation, the classifier training module 408 may be implemented using a library of SVM (LibSVM), however, other ML classifier models may also be used. For example, the DL classification operations 400 predicts that the type of DL 404 is JSON.

Figure 5:
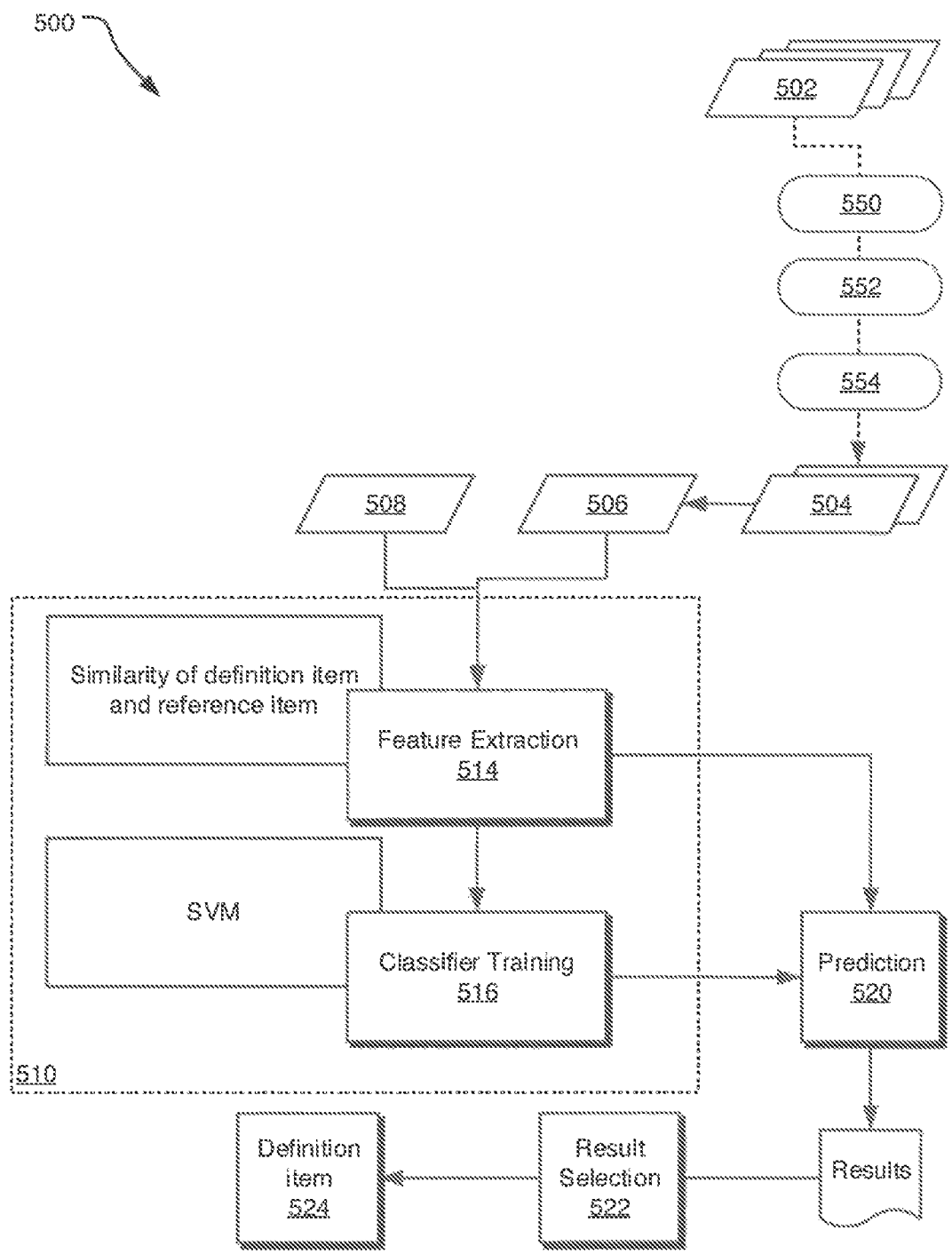
FIG. 5 illustrates example operations for definition detection using ML according to implementations disclosed herein.

FIG. 5 illustrates alternative example operations 500 for definition detection using ML according to implementations disclosed herein. The operations 500 may use an ML model 510 with a feature extraction module 514 and a classifier training module 516. A list of candidate definition items 504 is selected from a set of definition items 502. In one example, an edit-distance algorithm may be used to generate the candidate definition items 504 the definition items 502. The edit-distance algorithm may include the following considerations:

550: Split compound names according to case change or symbols. For example, "AutoDetectCliRequestPdu" is split as "Auto", "Detect", "Cli", "Request", "Pdu" whereas "TS_RAIL_PDU_Header" is split as "TS", "RAIL", "PDU", "Header." Subsequently, calculate distance based on segments.

552: Consider the cost differences due to case. For example, a distance from "TS_RAIL_PDU_Header" to "ts_rail_pdu_header" may have a lower value than ten(10) characters."

554: Use add or delete operations, for example, the distance between "AutoDetectCliRequestPDU" and "AutoDetectCliReqPDU" will be lower than "AutoDetectCliRequestPDU" and "AutoDetectSrvRequestPDU."

A set of definition items 506 is generated from the candidate definition items 504. The definition items 506 are input tn the ML model 510 together with reference items 508. The feature extraction module 514 may use similarities between the definition items 506 and the reference items 508 to extract the features from the definition items. The ML model 510 generates a prediction 520 and a result selection module 522 selects the results of the prediction 520 to find the definition item 524.

Figure 6:
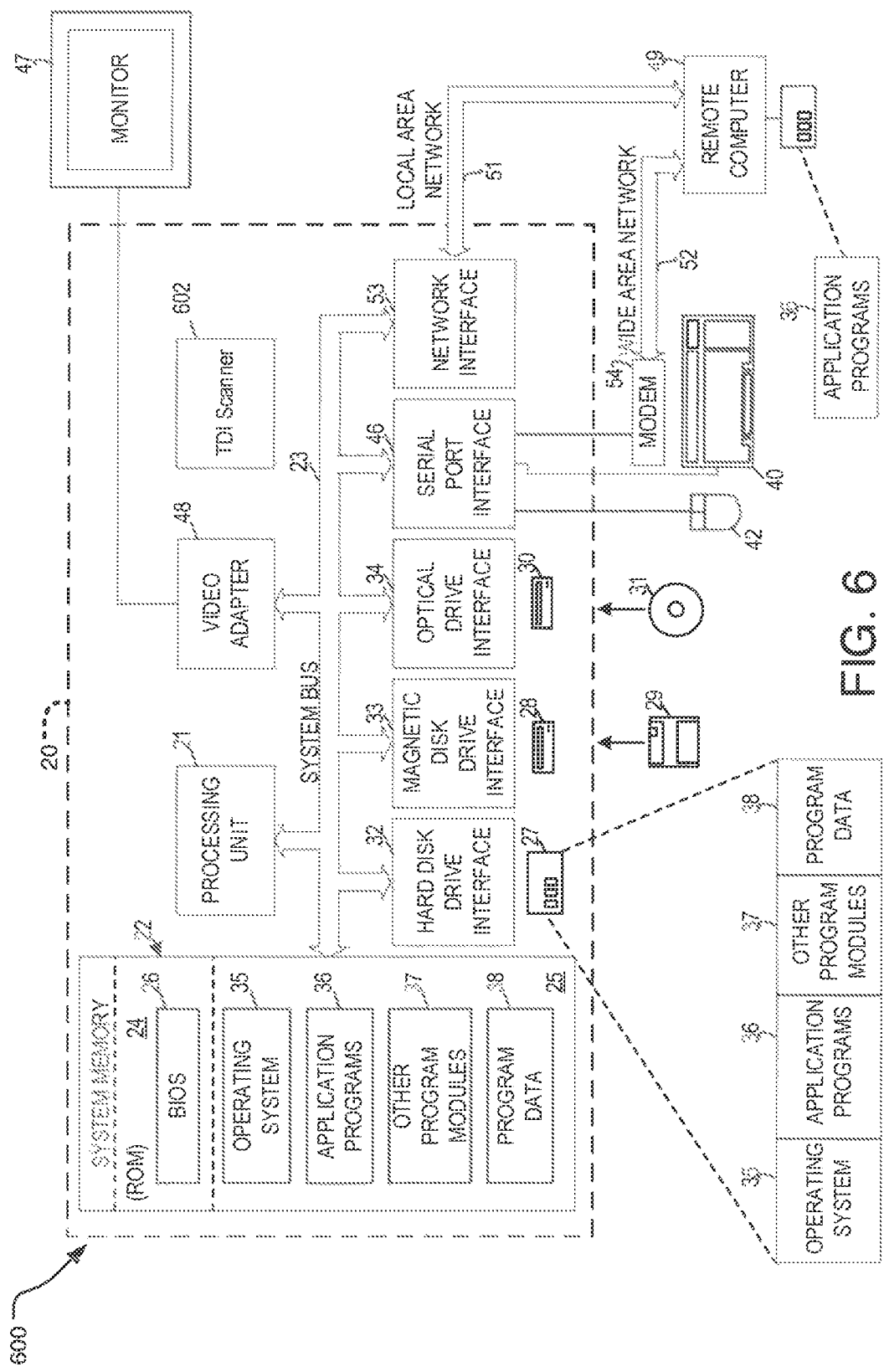
FIG. 6 illustrates an example computing system that may be useful in implementing the described technology.

FIG. 6 illustrates an example system 600 that may be useful in implementing the described technology for providing attestable and destructible device identity. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access, memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system has 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more ML, NLP, or DLP models disclosed herein may be stored in memory 22 and/or storage devices 29 or 31 as persistent data stores. For example, a TDI scanner 602 may be implemented on the computer 20 (alternatively, the TDI scanner 602 may be implemented on a server or in a cloud environment). The TDI scanner 602 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a earlier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RP, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing front the recited claims.

What is claimed is:

1. A physical article of manufacture including one or more tangible computer-readable storage media, encoding computer-executable instructions for executing on a computer system a computer process to provide attestable and destructible device identity, the computer process comprising:
   scanning a document to extract content;
   applying a named entity recognition (NER) model on the extracted content to extract named entities;
   extracting relations between the named entities by applying a relation extraction model on the named entities, wherein the relation extraction model is a long short-term memory (LSTM) model; and
   analyzing the relations between the named entities to compose lists of high relevance categories for issue checking.

2. The physical article of manufacture of claim 1, wherein the computer process further comprising extracting definitions for each of the named entities from the document.

3. The physical article of manufacture of claim 1, wherein the computer process further comprising extracting definitions for each of the named entities from the document using a machine learning (ML) algorithm.

4. The physical article of manufacture of claim 1, wherein the computer process further comprising checking the consistency for the list of high relevance categories.

5. The physical article of manufacture of claim 1, wherein scanning a document to extract content further comprising tokenizing parts of the document.

6. The physical article of manufacture of claim 5, wherein the computer process further comprising tagging one or more of the token using the NER model.

7. The physical article of manufacture of claim 1, wherein the LSTM model further comprises an input layer including representation of one or more of the named entities.

8. The physical article of manufacture of claim 7, wherein the LSTM model further comprises an LSTM layer including representation of one or more of the named entities using bidirectional LSTM-recursive neural networks (RNNs).

9. The physical article of manufacture of claim 1, wherein the named entities comprise at least one object definition entity and at least one object reference entity, and the relation extraction model associates the object definition entity with a definition list and the object reference entity with a reference list.

10. The physical article of manufacture of claim 9, wherein the analyzing of the relations between the named entities comprises identifying a definition from the definition list for a corresponding entity in the reference list.

11. In a computing environment, a method performed at least in part on at least one processor, the method comprising:
    scanning, a technical document to extract content;
    applying a named entity recognition (NER) model on the extracted content to extract named entities;
    extracting relations between the named entities by applying a relation extraction model on the named entities, wherein the relation extraction model is a long short term memory (LSTM) model; and
    analyzing the relations between the named entities to compose lists of high relevance categories for issue checking.

12. The method of claim 11, wherein the relation extraction model is a long short term memory (LSTM) model.

13. The method of claim 11, wherein scanning a technical document to extract content further comprising tokenizing parts of the technical document.

14. The method of claim 13, further comprising tagging one or more of the token using the NER model.

15. The method of claim 11, further comprising extracting definitions for each of the named entities from the technical document.

16. The method of claim 11, wherein the LSTM model further comprises:
    an input layer including representation of one or more of the named entities; and
    an LSTM layer including representation of one or more of the named entities using bidirectional LSTM-recursive neural networks (RNNs).

17. In a computing environment, a system comprising:
    memory;
    one or more processor units;
    a document issue scanner system stored in the memory and executable by the one or more processor units, the document issue scanner system encoding computer-executable instructions on the memory for executing on the one or more processor units a computer process, the computer process comprising:
    scanning a technical document to extract content;
    applying a named entity recognition (NER) model on the extracted content to extract named entities;
    extracting relations between the named entities by applying a relation extraction model on the named entities, wherein the relation extraction model is a long short term memory (LSTM) model; and
    analyzing the relations between the entities to compose lists of high relevance named entities for issue checking.

18. The system of claim 17, wherein the computer process further comprising extracting definitions for each of the named entities from the technical document using a machine learning (ML) algorithm.

19. The system of claim 18, wherein the ML algorithm comprises:
    a feature extraction operation using term frequency-inverse term frequency (TF-IDF) on unigrams scanned from the technical document; and
    a classifier training operation.

20. The system of claim 19, wherein the classifier training operation uses a support vector machine (SVM) classifier.

* * * * *